T. SAUNDERS & H. P. CHASE.
NET LIFTING APPARATUS.
APPLICATION FILED FEB. 21, 1911.

1,002,762.

Patented Sept. 5, 1911.
3 SHEETS—SHEET 1.

Witnesses
J. Milton Jester
L. C. Braddy

Inventors
Thomas Saunders
and Henry P. Chase
By John S. Barker,
their Attorney

T. SAUNDERS & H. P. CHASE.
NET LIFTING APPARATUS.
APPLICATION FILED FEB. 21, 1911.

1,002,762.

Patented Sept. 5, 1911.
3 SHEETS—SHEET 2.

Witnesses
J. Milton Lester
L. C. Brady

Inventors
Thomas Saunders
and Henry P. Chase
By John S. Barker
their Attorney

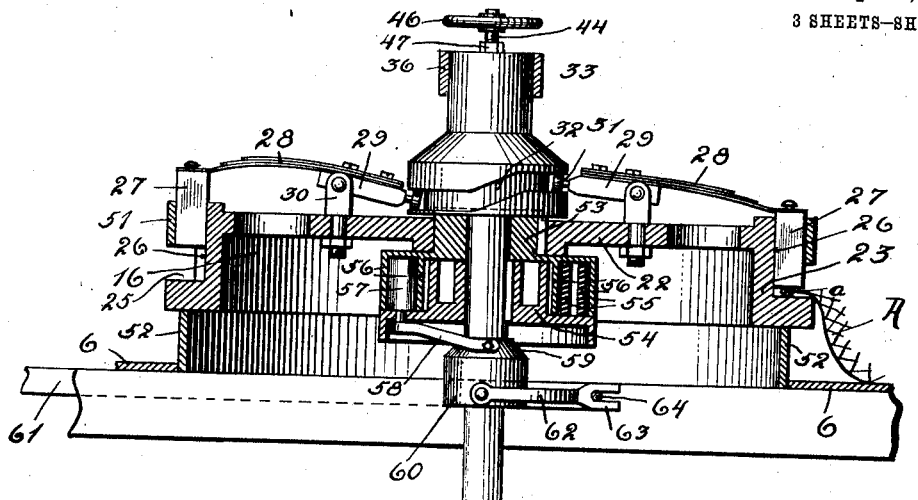

UNITED STATES PATENT OFFICE.

THOMAS SAUNDERS AND HENRY P. CHASE, OF PENTWATER, MICHIGAN.

NET-LIFTING APPARATUS.

1,002,762.  Specification of Letters Patent.  Patented Sept. 5, 1911.

Application filed February 21, 1911.  Serial No. 610,106.

*To all whom it may concern:*

Be it known that we, THOMAS SAUNDERS and HENRY P. CHASE, citizens of the United States, residing at Pentwater, in the county of Oceana and State of Michigan, have invented new and useful Improvements in Net-Lifting Apparatus, of which the following is a specification.

Our invention relates to net-lifting and hauling apparatus, and more particularly to that type of such mechanism which is employed aboard ship for lifting and drawing in gill nets; and it has for its object to improve the apparatus so as to produce a superior machine, and one less liable to injure the net than those heretofore known and used for similar purposes.

For the purpose of illustrating our invention we have, in the accompanying drawings, represented an apparatus embodying the principles thereof, without, however, intending thereby to limit ourselves in the useful applications and embodiments of the invention to the specific apparatus illustrated.

Figure 1:
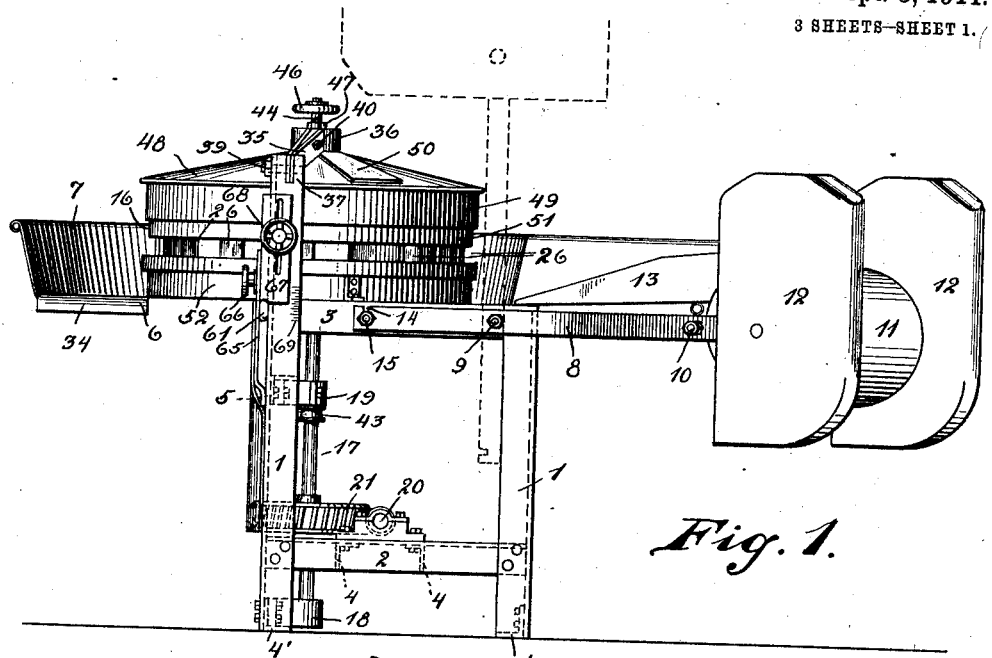
Figure 2:
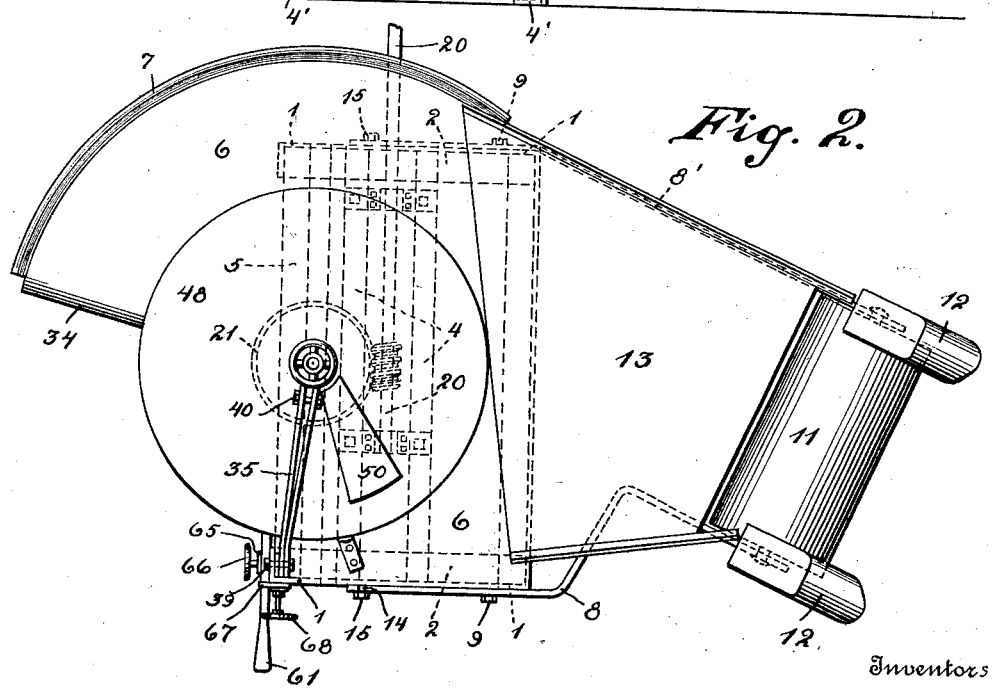
Figure 3:
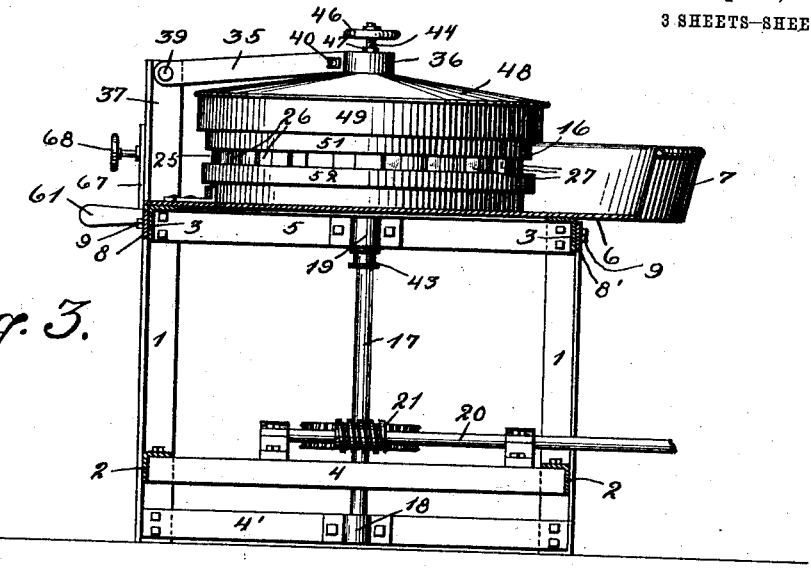
Figure 4:
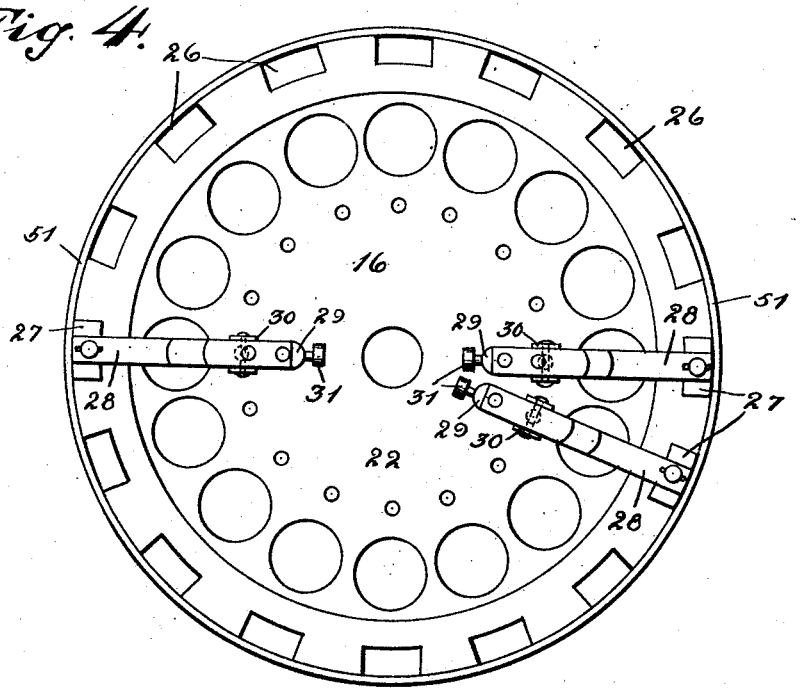

Referring to such drawings, Figure 1 is a side elevation of a fish-net-lifting apparatus embodying our improvements. Fig. 2 is a top plan view of the apparatus. Fig. 3 is a vertical sectional view of the same, the lifting drum being shown in elevation. Fig. 4 is a plan view of the lifting wheel or drum, drawn to a larger scale than the views already described and showing but three of the line or rope grippers and their supporting arms. Fig. 5 is a vertical sectional view of the apparatus taken centrally through the lifting drum. Fig. 6 is a detail perspective view of one of the gripping blocks and the parts that support and operate it. Fig. 7 is a detail vertical sectional view of the adjustable cam head by means of which the gripper blocks are caused to operate.

The apparatus which embodies our invention is supported near the side of a vessel by a suitable framework, that which we have illustrated comprising the legs or uprights 1, the lower cross pieces 2, the upper cross pieces 3, and the longitudinal connecting pieces 4, 4, 4', 4', 5. In the upper portion of this frame is mounted the rotatable lifting drum, surrounding or partly surrounding which is a table 6 shaped and supported to direct the net as it is being drawn in, the table having a curved edge rim or flange 7. The lifting drum, which is a power-driven device arranged to engage with the cords or lines *a* of the net A and therefore lift and draw it in, is supported at the upper end of the drive shaft, at a level a little above that of the table 6.

To assist in directing the net to the lifting drum and the table, we prefer to employ a pivoted frame adapted to be swung outward so as to overlie the gunwale of the vessel when the apparatus is in use, or to be turned up and held in an inboard position, as indicated in dotted lines in Fig. 1, when the apparatus is not being used. This frame consists essentially of a pair of arms 8, 8' pivotally connected, at 9, 9, with the main supporting frame, and a large roller 11 supported in the ends of the arms. Cross pieces 10 may be employed to connect and brace the arms and impart the desired strength thereto. The arms are bent, as indicated in Fig. 2 so that the swinging frame when turned down into working position is substantially tangential to the lifting drum. Cheek or guide pieces 12, 12 carried by the swinging frame are arranged at the ends of the roller 11 and serve to guide the net and prevent it from running off the ends of the roller. The arms 8, 8' are not only bent or angular as illustrated, but one of them, 8', is longer than the other, so that the roller 11 when turned down into working position stands at such an angle to the rail of the vessel that the operator, who stands by the side of the arm 8, is in convenient position to catch with a gaff hook any fish that might drop from the net on being drawn out of the water. A removable flanged plate 13, supported by the swinging frame when the apparatus is in use, serves to bridge the space between the roller 11 and the table 6. This plate is removed before the frame is swung into the position indicated by dotted lines in Fig. 1. The arms 8, 8' extend inward beyond the pivots 9 and are slotted, as indicated at 14, or otherwise constructed to engage with bolts 15 which serve as stops to arrest the frame in working position and which may also be used as clamping bolts to hold the frame in place.

The lifting drum, designated as a whole by 16, is mounted at the upper end of a vertical driving shaft 17, being loosely supported thereon but arranged to be connected therewith through clutch mechanism to be described. The vertical drive shaft is supported in suitable manner, as by a step bearing 18, and an intermediate bearing 19, and it is connected with the main power shaft 20 through worm gearing 21 arranged to impart to the drive shaft a relatively slow rotation. The construction of the lifting drum is best indicated in Figs. 4 and 5. It preferably consists of a web or disk 22 having a peripheral flange 23 in which is formed an external open groove or channel 25 into which is carried the ropes $a$ of the net, to be engaged by the gripping members of the lifting drum. Opening into this peripheral flange are a series of vertical guide-ways 26 in which are mounted the gripping blocks 27 supported at the ends of elastic arms 28 preferably formed of metallic springs secured to rocker arms 29 that, in turn, are pivotally supported in bearings 30 seated in the web of the lifting wheel. The inner ends of the rocker arms carry rollers 31 arranged to run in a cam groove 32 formed in a head 33 located at the axial center of the lifting drum and just above its upper face. The cam is shaped to intermittently rock the arms 29 as the drum 16 is revolved, lifting the gripping blocks clear of the channel 25 throughout a portion of the revolution of the drum, and forcing them downward into the channel throughout another part of its revolution.

It is to be understood that in using our apparatus to lift a gill or other fishing net, one end of the net is lifted and drawn over the side of the vessel passing the roller 11 of the outward swinging frame, across the guide plate 13 and on to the table 6. The rope $a$ of the net is then laid in the channel 25 and is therein gripped or clamped by the blocks 27 and thereby held firmly, though yieldingly, as the drum is rotated. The movement of the drum draws in the net, carrying it across the table 6 to the edge 34 thereof, where it drops off. About the time the gripping blocks come opposite to this edge of the table the cam 32 operates to lift them, freeing the rope which is then free to pass out of the groove 25 as the net falls from the table.

The head 33 in which is formed the cam groove is, as stated, stationary, that is to say, it does not rotate with the drum, though it is vertically adjustable for a purpose to be stated later. It is supported at the upper end of the drive shaft and is held in place by brace 35 which is mounted in any suitable manner. We prefer that it should be easily removable, and have represented it as being bolted at 39 to an upright 37 of the stationary supporting framework, and as being formed of bar metal doubled upon itself so as to constitute an encircling band 36 surrounding the cam head 33, the two parts of the brace being held together by a bolt 40 that serves as a clamp by means of which the band 36 of the brace can be made to engage tightly with the head.

As represented in Fig. 7, the upper end of the drive shaft 17 enters an axial bore or opening 41 in the head 33 where it freely turns. The lower portion of this axial bore is preferably enlarged or chambered, as indicated at 24, to receive a set collar 42 fixed upon the shaft 17, and operating to prevent the drum 16 from being bodily lifted as the ends of the rocker arms 29 travel up the rising portions of the cam 32 and remain in engagement with the higher level thereof. The shaft 17 also carries a set collar 43 located below the stationary bearing 19 and operating to prevent the shaft from being bodily lifted whenever an upward strain is applied thereto.

The cam head 33 is vertically adjustable in order that the force with which the gripping blocks 27 engage with the rope of the net, may be varied, it being understood that by lifting the head the springs, constituting the elastic arms 28 that support the gripper blocks, will be flexed to a greater extent as the rollers 31 travel along the higher level of the cam, and the force with which the blocks engage with the rope correspondingly increased. If the head be lowered the gripping force of the blocks 27 will be decreased, as will be understood. The means by which we accomplish the adjustment of the head 33 is a screw 44 seated in the upper end 38 of the head 33 and bearing against the upper end of the shaft 17 or, preferably, against a disk 45 of hard steel interposed between the ends of the screw and the shaft. The screw is provided with a hand wheel 46 by which it is manipulated, and preferably has mounted upon it a set nut 47.

The lifting drum, the parts which it carries, and the cam head 33, are preferably covered by a stationary hood 48 held in place by the brace 35 or in any other suitable and convenient manner. This hood has a skirt or flange 49 that fits the periphery of the lifting drum quite closely and operates to prevent objects from accidentally getting into the working parts of the apparatus. The hood may be formed with an opening through which access may be had to the working parts of the drum, and when employed, it is, under normal working conditions, closed by a cover 50. A peripheral band 51 is preferably applied to the drum to close at the outside the vertical guideways 26, in which work the lifting blocks 27. It serves not only to hold in place the gripping blocks and to direct their movements, but also forms a smooth and relatively close running joint between the drum and the lower edge of the skirt of the cover or hood thereof. As already stated, the drum is preferably mounted some distance above the level of the table 6, and the space between these two is closed by an annular stationary band 52 which serves to prevent any parts of the net, or other objects, from getting into the lifting drum from below and becoming entangled with the moving parts of the apparatus.

We have already described the drum 16 as being driven from the shaft 17. The connection between these two is not direct and rigid, but rather preferably through a friction clutch mechanism which insures that when the strain upon the drum exceeds a certain determined limit, the parts of the clutch will slip. This permits the apparatus to be so adjusted that when in use it will not put greater strain upon the net than it is capable of withstanding. It is well understood by those familiar with net-lifting apparatus, that when in use the strain upon the rope of the net is constantly varying, owing to the pitching of the vessel, or the net becoming caught on some outside object, or from other causes, and it frequently happens that the rope is broken and the net injured because of the excessive strains which are applied to the net. But by providing a friction clutch, and combining therewith means for adjusting the clutch, such as we have herein illustrated and will now describe, the apparatus can be adjusted to suit the strength of the parts of the net which is being lifted, thus overcoming the danger of breaking the rope and tearing the net.

The clutch illustrated in connection with our invention is of a well known type and its details of construction are therefore not claimed by us, and they will be only sufficiently described to enable an understanding of the operation of the apparatus. The clutch is mounted upon the shaft 17 and is preferably located directly below the web plate 22 of the lifting drum within the chamber inclosed by the flange 23 thereof. It consists essentially of two members, one, 53, secured fast to the lifting drum, and the other, 54, secured fast to the driving shaft. One of these members, for instance the one secured to the driving shaft, carries a pair of friction shoes 55 that are arranged to be forced into engagement with friction flanges 56 of the other clutch member, by the operation of a wedge piece 57, and thus unite the clutch members in frictional engagement. The wedge piece 57 is supported in the shaft member 54 of the clutch so as to be free to turn, and is provided with an arm 58, the end of which stands opposite to the cone-shaped face 59 of an adjustable collar 60 loosely mounted upon the shaft 17 and longitudinally adjustable thereupon.

61 designates a lever by which the collar 60 is adjusted and set. It is secured to a yoke 62 that engages with the collar, and has a forked end 63 that engages with a cross bearing 64, or other suitable stationary object that serves as a fulcrum for the lever. It will be understood that by lifting the outer end of the lever, the yoke 62 and the collar 60 will be carried upward, and the cone face 59 of the latter will be caused to engage with the rocking arm 58, and the wedge 57 will cause the friction surfaces of the clutch members to come into engagement, with a force proportional to the extent to which the lever is moved. The free end of the clutch-moving lever, is carried out to one side of the frame where it may be conveniently reached and manipulated, and is held in those positions to which it may be adjusted by a clamp 65 and set screw 66. An adjustable gage plate 67 supported by the upright 37 is arranged adjacent to the lever arm 61 and serves as a stop therefor. This gage plate may be secured in any desired position by means of a clamp screw 68, and is preferably set by reference to a scale 69 graduated to indicate the pressure or strain at which the clutch will slip when the gage is set to the designated mark, and the lever 61 brought into engagement with the stop plate and there secured. By the means described the clutch can be adjusted without stopping the engine and can be accurately set to suit the work in hand.

The operation of the apparatus will be readily understood from the foregoing description of its parts and a consideration of the accompanying drawings. The net is brought over the table 6 and the line or cord $a$ carried into the channel 25 and engaged by the gripping blocks 27. After the initial starting of the net-lifting, the operation of the apparatus is almost automatic, the net line being automatically gripped and released by the blocks 27 as the drum revolves about the cam head 33. If the pressure exerted by the lifting blocks upon the line of the net be too little or too great, this can be easily remedied by vertically adjusting the cam head 33. It will be understood that under all working conditions the gripping blocks should engage with the net rope or line with sufficient force to prevent any slipping of the rope, whatever be the strains to which the parts are subjected. Should it be found that the apparatus is not exerting sufficient power to lift the net as desired, indicating slipping in the clutch, the lever 61 can be adjusted so that a greater lifting power may be secured. On the other hand, should it be found that the power of the machine, as developed through the friction clutch, is so great as to endanger the net, the clutch lever can be adjusted to permit slippage when the strains exceed a point well within the limits of safety in operating upon the particular net being lifted. The adjustments can be quickly, easily, and accurately effected, as is apparent from a consideration of the apparatus illustrated.

What we claim is:—

1. In a net-lifting apparatus, the combination of a rotatable drum having a rope seat, grippers for engaging with the rope, spring arms formed of inherently elastic material supported upon the drum and carrying the grippers, and means arranged to operate the arms to cause the grippers to successively clamp and release the rope as the drum is rotated, substantialy as set forth.

2. In a net-lifting apparatus, the combination of a rotatable drum having a rope seat, grippers for engaging with the rope when in said seat, spring arms supported by the drum and carrying the grippers, means arranged to operate the arms to cause the grippers to successively clamp and release the rope as the drum is rotated, and means for adjusting the said operating means to regulate the pressure with which the grippers clamp the rope, substantially as set forth.

3. In a net-lifting apparatus, the combination of a rotatable drum having a rope seat, grippers for engaging with the rope when in said seat, spring arms by which the grippers are carried, rocker arms pivotally suported by the drum carrying the said spring arms, and means arranged to operate the rocker arms to cause the grippers to successively clamp and release the rope as the drum is rotated, substantially as set forth.

4. In a net-lifting apparatus, the combination of a rotatable drum having a rope seat, grippers for engaging with the rope when in said seat, spring arms by which the grippers are carried, rigid rocker arms pivotally supported upon the drum and to which the said spring arms are secured, and a cam for operating the said rocker arms to cause the grippers to successively clamp and release the rope as the drum is rotated, substantially as set forth.

5. In a net-lifting apparatus, the combination of a rotatable drum having a rope seat, gripping means for engaging with the rope, a cam concentric with the axis of rotation of the drum for operating the said gripping means, and means for adjusting the said cam arranged at the axis of revolution of the drum, substantially as set forth.

6. In a net-lifting apparatus, the combination of a rotatable drum having a rope seat, a drive shaft therefor, gripping means for engaging with the rope, a cam concentric with the drive shaft for operating the said gripping means, and means for adjusting the said cam bearing upon the drive shaft, substantially as set forth.

7. In a net-lifting apparatus, the combination of a horizontally-disposed lifting drum having a rope seat, a vertical drive shaft therefor, gripping means carried by the drum for engaging with the rope when in said seat, a non-rotatable head at the upper end of the shaft in which is formed a cam groove with which the gripping means engage, and an adjusting screw bearing upon the end of the drive shaft and arranged to adjust the aforesaid cam head, substantially as set forth.

8. In a net-lifting apparatus, the combination of a horizontally disposed rotatable drum having a rope seat, a vertical drive shaft therefor, gripper means carried by the drum for engaging with the rope when in its seat, a non-rotatable head at the upper end of the shaft carrying a cam for operating the gripper means, means for adjusting the cam head bearing upon the drive shaft, and a removable hood completely covering the upper face of the drum and having a skirt that extends over the periphery thereof but leaves exposed the rope seat, substantially as set forth.

THOMAS SAUNDERS.
HENRY P. CHASE.

Witnesses:
E. J. CLARK,
WILLIAM J. CASTLE.

---

Copies of this patent may be obtained for five cents each, by addressing the "Commissioner of Patents, Washington, D. C."